(12) United States Patent
Murai et al.

(10) Patent No.: US 6,206,146 B1
(45) Date of Patent: Mar. 27, 2001

(54) DISC BRAKE ASSEMBLY

(75) Inventors: Kiyotaka Murai; Kenji Takahashi, both of Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 08/411,202

(22) Filed: Mar. 27, 1995

(30) Foreign Application Priority Data

Mar. 30, 1994 (JP) .................................................. 6-061473

(51) Int. Cl.⁷ ...................................................... F16D 65/38
(52) U.S. Cl. ............................................................ 188/73.36
(58) Field of Search ........................... 188/73.1, 73.37, 188/73.36, 250 B, 250 E, 73.2, 218 XL, 18 A, 207, 286

(56) References Cited

U.S. PATENT DOCUMENTS

| | | | |
|---|---|---|---|
| 4,076,106 | * 2/1978 | Bermingham | 188/73.2 |
| 4,240,530 | * 12/1980 | Tillenburg | 188/250 E |
| 4,471,858 | * 9/1984 | Kawase | 188/73.36 |
| 4,600,090 | * 7/1986 | Feldmann | 188/73.2 |
| 4,705,146 | * 11/1987 | Tarter | 188/73.1 |
| 5,363,943 | * 11/1994 | Iwashita | 188/250 E |
| 5,535,860 | * 7/1996 | Hummel | 188/250 B |

FOREIGN PATENT DOCUMENTS 3-79820   4/1991   (JP) .

* cited by examiner

Primary Examiner—Christopher P. Schwartz
Assistant Examiner—C. T. Bartz
(74) Attorney, Agent, or Firm—Oliff & Berridge, PLC

(57) ABSTRACT

A disc brake assembly having a pair of brake shoes to be pressed into contact with a disc rotor secured for rotation with a road wheel of an automotive vehicle, wherein the brake shoes each are provided with a pair of laterally spaced friction pad members respectively formed in a trapezoid configuration the outer sides of which are formed as hypotenuse, and wherein a distance between upper opposite ends of each pair of the friction pad members is determined to be less than about 1/12 of the circumferential length of said disc rotor.

3 Claims, 5 Drawing Sheets

Fig. 3 (A)
Fig. 3 (B)
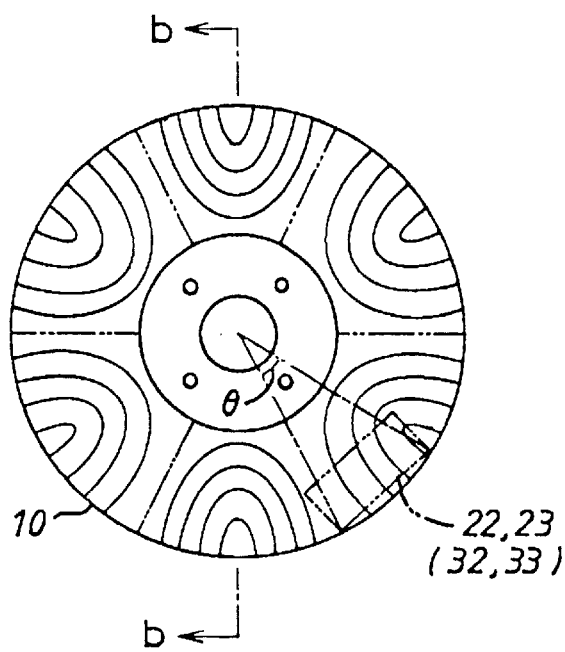
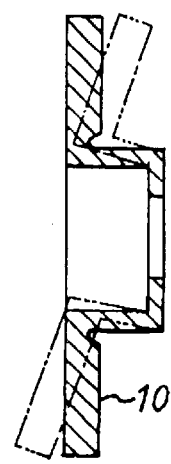
Fig. 4
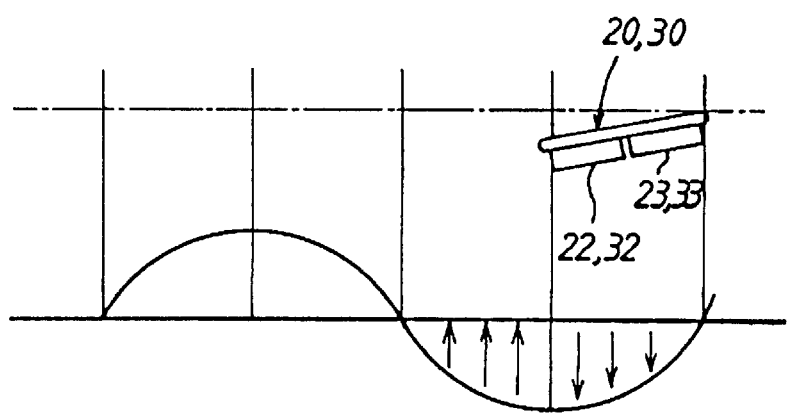

DISC BRAKE ASSEMBLY

BACKGROUND OF THE INVENTION

1. Field of the Invention

The present invention relates to a disc brake assembly having a pair of brake shoes the friction pad members of which are pressed into contact with a disc rotor secured for rotation with a road wheel to apply a braking force to the road wheel.

2. Discussion of the Prior Art

In conventional disc brake assemblies, various countermeasures have been adapted to reduce brake noises caused by vibration of the disc rotor, brake shoes or the like. For example, Japanese Patent Laid-open Publication No. 3-79820 discloses a disc brake assembly in which the friction pad members of the brake shoes each are divided into two parts in a circumferential direction of the disc rotor to reduce brake noises. With the conventional countermeasures, however, the brake noises may not be sufficiently reduced.

Based on a theoretical analysis and experiments, the inventors have found the fact that the brake noises are caused by a vibration wave of three-nodes diametric mode, i.e. a vibration wave the one-wave length of which is one third ($\frac{1}{3}$) of a circumferential length of the disc rotor.

SUMMARY OF THE INVENTION

It is, therefore, an object of the present invention to provide a disc brake assembly which is constructed to restrain the occurrence of the vibration wave of three-nodes diametric mode for reducing the brake noises in a more reliable manner.

According to the present invention, the object is accomplished by providing a disc brake assembly having a pair of brake shoes to be pressed into contact with a disc rotor secured to rotation with a road wheel, wherein each friction pad member of the brake shoes has an upper portion the width of which is determined to less than about $\frac{1}{12}$ of a circumferential length of the disc rotor at a position to be brought into frictional engagement with the upper portion of the friction pad member.

Preferably, the brake shoes each are provided a pair of laterally spaced friction pad members, wherein a distance between upper outermost opposite ends of each pair of the friction pad members is determined to be less than about 1/12 of the circumferential length of the disc rotor.

BRIEF DESCRIPTION OF THE DRAWINGS

Other objects, features and advantages of the present invention will be more readily appreciated from the following detailed description of certain preferred embodiments thereof when taken together with reference to the accompanying drawings, in which:

FIG. 3(A) is a front view of a disc rotor for explanation of a vibration wave of the three-nodes diametric mode caused by the disc rotor;

FIG. 3(B) is a cross-sectional view taken along line bb in FIG. 3(A);

FIG. 4 is a graph showing a size of a friction pad member of the brake shoe in comparison with the vibration wave of the three-nodes diametric mode;

DESCRIPTION OF THE PREFERRED EMBODIMENTS

Figure 1:
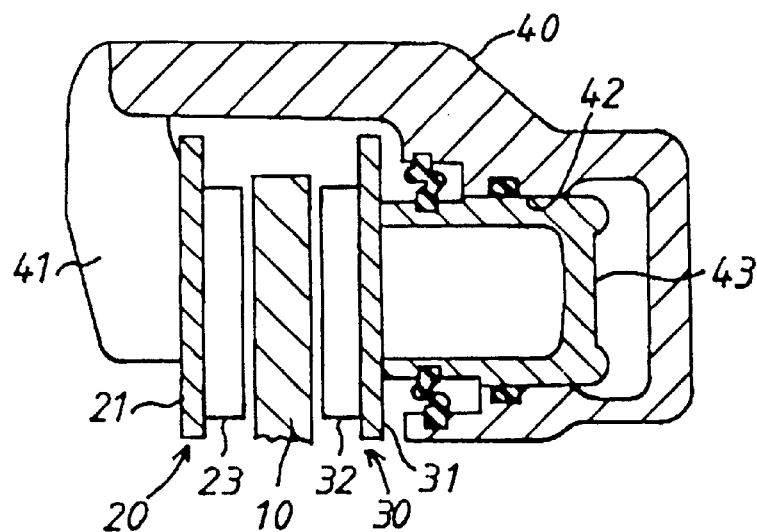
FIG. 1 is a sectional view of a disc brake assembly.

In FIG. 1 of the drawings, there is illustrated an embodiment of a disc brake assembly in accordance with the present invention. The disc brake assembly includes a disc rotor 10 secured for rotation with a road wheel of an automotive vehicle and a pair of brake shoes 20, 30 arranged to be pressed into contact with opposite surfaces of the disc rotor 10. The outside brake shoe 20 is axially slidably mounted on a stationary support member (not shown) fixed to a body structure of the vehicle in a conventional manner. The outside brake shoe 20 is positioned inside an arm portion 41 of a caliper member assembled with the stationary support member to be axially movable and straddling a portion of the disc rotor 10. The inside brake shoe 30 is axially slidably mounted on the stationary support member in the same manner as the outside brake shoe 20 and positioned inside a piston 43 slidably mounted within a cylinder 42 formed in the caliper member 40.

Figure 2:
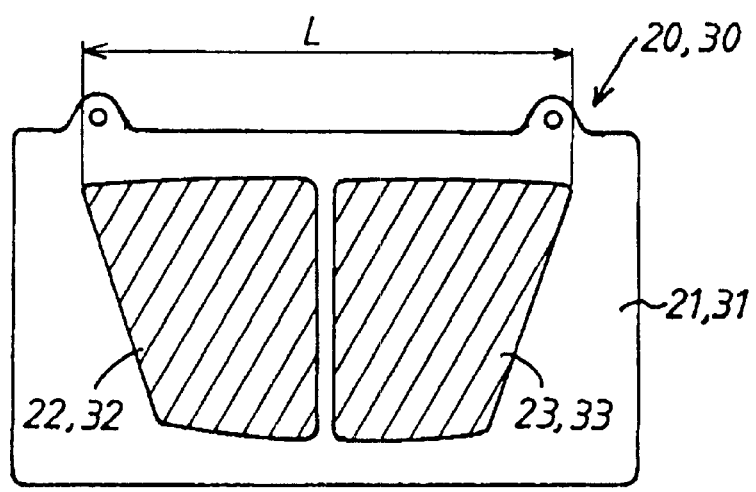
FIG. 2 is a front view of a brake shoe shown in FIG. 1.

As shown in FIGS. 1 and 2, the brake shoe 20 is composed of a rectangular backing plate 21 and a pair of friction pad members 22, 23 secured to the surface of backing plate 21. Similarly, the brake shoe 30 is composed of a rectangular backing plate 31 and a pair of friction pad members 32, 33 secured to the surface of backing plate 31. The friction pad members 22, 23 and 32, 33 each are made of a heat-resistant material such as an asbestos-resin material and formed in a trapezoid configuration the outer sides of which are each formed as an oblique side. The inner sides of each pair of the friction pad members 22, 23 and 32, 33 are formed approximately perpendicular to the upper and bottom bases and spaced in a slight distance to one another. The friction pad members 22, 23 and 32, 33 each are formed wider in width at their upper sides opposed to a diametrically outer portion of the disc rotor 10. A distance L between the upper opposite ends of each pair of the friction pad members 22, 23 and 32, 33 is determined to be less than one twelfth ($\frac{1}{12}$) of a circumferential length of the disc rotor 10 at its diametrically outer portion. In addition, each width of the friction members 22, 23 and 32, 33 is determined to become gradually narrow toward the bottom side of the respective friction members opposed to a diametrically inner portion of the disc rotor 10.

In operation, the cylinder 42 of the disc brake assembly is supplied with hydraulic fluid under pressure by depression of a brake pedal (not shown) so that the piston 43 is moved by the hydraulic fluid under pressure to displace the brake shoe 30 toward one surface of the disc rotor 10 while the caliper member 40 is moved by a reaction force applied thereto to displace the brake shoe 20 toward the other surface of the disc rotor 10. Thus, the brake shoes 20, 30 are pressed into contact with the disc rotor 10 to apply a braking force to the road wheel.

When the friction pad members 22, 23 and 32, 33 have been engaged with the opposite surfaces of the disc rotor 10 in such braking operation as described above, the disc rotor 10 is oscillated by abutment with the friction pad members 22, 23 and 32, 33 due to irregularity in thickness of the disc rotor 10, roughness of the surfaces of the disc rotor 10 and friction pad members 22, 23, 32, 33, a pressed condition of the brake shoes 20, 30 and so forth. In such oscillation of the disc rotor 10, there occurs a large vibration wave at a three-nodes diametric mode, i.e. a vibration wave of one third (⅓) of the circumferential length of disc rotor 10, as shown in FIG. 3(A). The vibration wave will be attenuated even if caused at an initial stage. However, if the vibration wave is continuously caused by vibration of the disc rotor, there will occur unpleasant brake noises.

Since in this embodiment the distance L between the upper opposite ends of each pair of the friction pad members 22, 23, 32, 33 is determined to be less than about one twelfth (1/12) of the circumferential length of the disc rotor 10, the distance L becomes less than the wavelength of the vibration wave as shown in FIG. 4. Accordingly, the friction pad members 22, 23, 32, 33 follow the vibration wave without any repulsion to reduce the oscillation frequency and degree of the disc 10 thereby to restrain the occurrence of brake noises. This is effective to sufficiently reduce the brake noises caused by the vibration wave of the three-nodes diametric mode.

Figure 5:
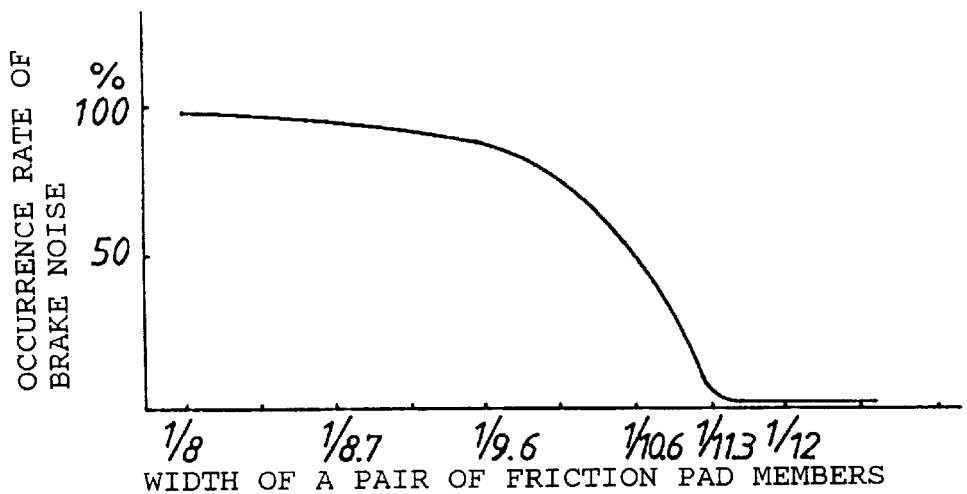
FIG. 5 is a graph showing the occurrence rate of brake noises in relation to the width of a friction pad member of the brake shoe.
Figure 6:
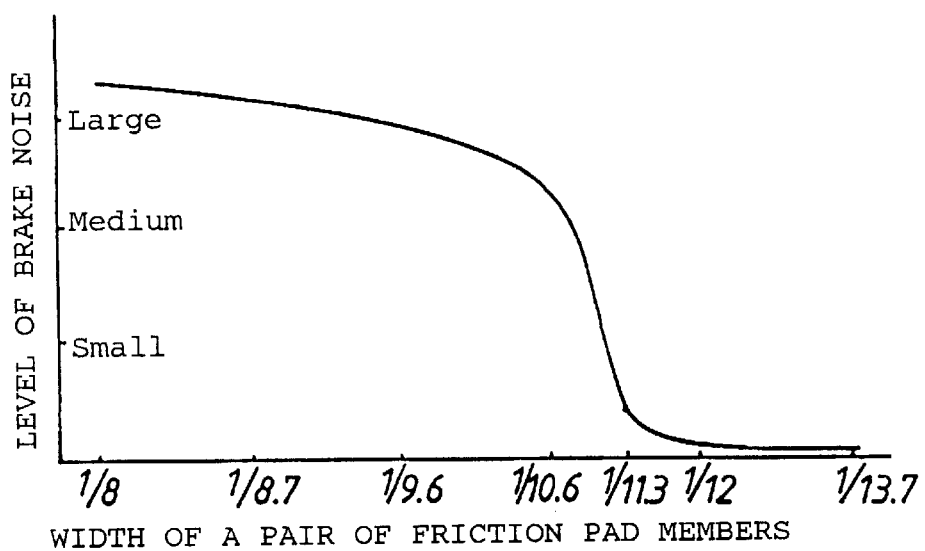
FIG. 6 is a graph showing a level change of brake noises in relation to the width of the friction pad member of the brake shoe.

Illustrated in the graphs of FIGS. 5 and 6 is a result of experiments wherein the distance L between the upper opposite ends of each pair of the friction members 22, 23; 32, 33 has been changed in various distances to measure the occurrence rate of brake noises. On the abscissa of the respective graphs, a ratio of the distance L relative to the circumferential length of the disc rotor 10 is represented in a fraction. As is understood from the graphs, the occurrence rate and level of brake noises become small in accordance with reduction of the distance L. In the case that the distance L is determined to be about 1/11.3 of the circumferential length of the disc rotor 10, the occurrence rate of brake noises tends to decrease. In the case that the distance L is determined to be less than about 1/12 of the circumferential length of the disc rotor 10, the occurrence rate and level of brake noises noticeably decreases.

Figure 7:
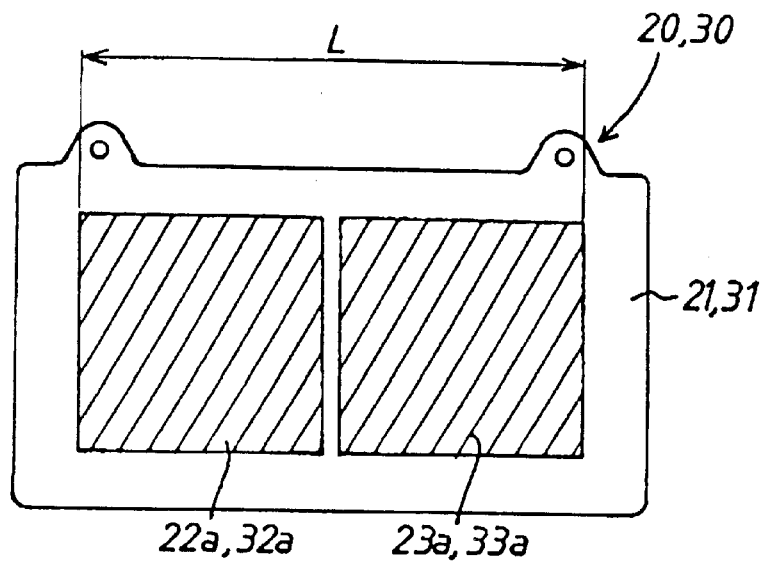
FIG. 7 is a front view of a brake shoe in a modification of the present invention.

In FIG. 7 there is illustrated a modification of the brake shoes 20, 30 in which each pair of friction pad members 22a, 23a and 32a, 33a secured to the backing plates 21, 31 are formed in a rectangular configuration. In this modification, each pair of the friction pad members 22a, 23a and 32a, 33a are spaced in a slight distance to one another, and the width L of each pair of the friction members at their upper opposite ends is determined to be less than about 1/12 of the circumferential length of the disc rotor 10.

Figure 8:
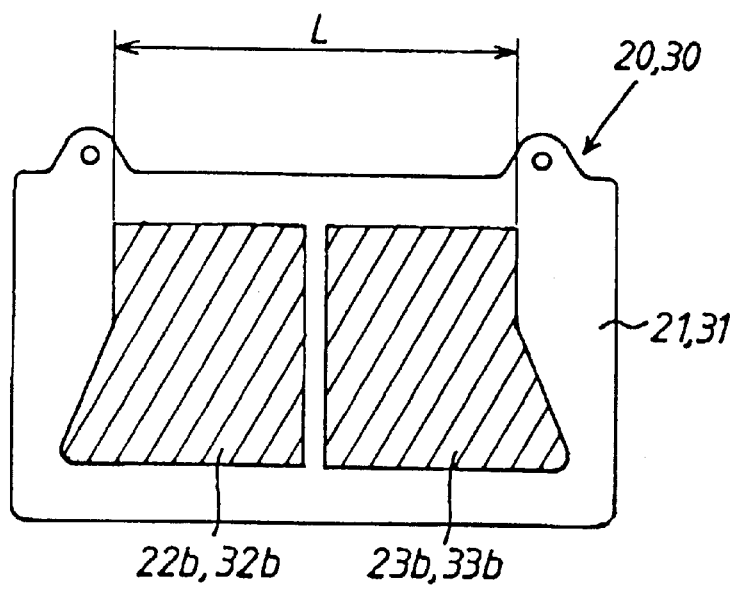
FIG. 8 is a front view of a brake shoe in another modification of the present invention.

In FIG. 8 there is illustrated another modification of the brake shoes 20, 30 in which each pair of friction members 22b, 23b and 32b, 33b secured to the backing plates 21, 31 has an upper portion formed in a predetermined width and a lower portion formed wider toward the bottom side thereof. In this modification, each pair of the friction pad members 22b, 23b and 32b, 33b are spaced in a slight distance to one another, and the width L of each pair of the friction members 22b, 23b and 32b, 33b at their upper opposite ends is determined to be less than about 1/12 of the circumferential length of the disc rotor 10. In addition, the width L is determined to be about thirty five (35) % of the radius of the disc rotor 10.

With the brake shoes 20, 30 in the modifications described above, each surface area of the friction pad members 22a, 23a, 32a, 33a (or 22b, 23b, 32b, 33b) becomes large to maintain a heating value thereof in a small value. As a result, the braking performance is effected in a good condition without causing any reduction of frictional coefficients of the friction pad members. Although in the modification of FIG. 8, the lower portion of each pair of the friction pad members 22b, 23b, 32b and 33b becomes larger than 1/12 of the circumferential length of the disc rotor 10 opposed thereto, brake noises do not increase for the following reasons.

1) Since the amplitude of the vibration wave of three-nodes diametric mode on the disc rotor 10 becomes small in accordance approach toward the center of the disc rotor 10 as shown by two-dots and dash lines in FIG. 3(B), the level of brake noises caused by the vibration wave becomes lower, and also the excitation degree of the vibration wave becomes small.

Figure 9:
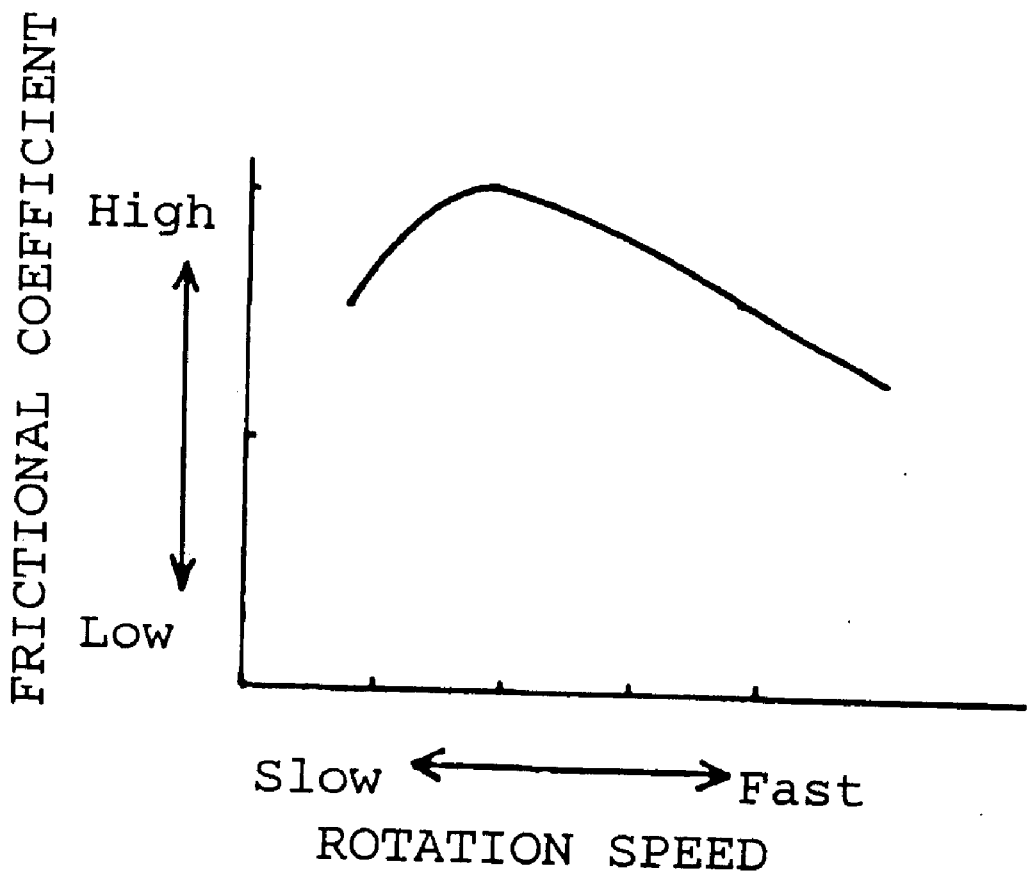
FIG. 9 is a graph showing a frictional coefficient in relation to a rotation speed of the disc rotor in its diametric direction.

2) At the diametrically inner portion of the disc rotor 10, the rotation speed of disc rotor 10 is lower than that at the diametrically outer portion of the disc rotor, and the friction coefficient $\mu$ of the respective friction pad members 22b, 23b, 32b, 33b becomes smaller than that at the diametrically outer portion of the disc rotor as shown in FIG. 9.

Accordingly, the enlarged lower portion of the respective friction pad members 22b, 23b, 32b and 33b do not affect the reduction of brake noises. In the case that the friction pad members 22, 23, 32, 33 (22a, 23a, 32a, 33a or 22b, 23b, 32b, 33) are chamfered, the width L is determined by the upper side of each pair of the friction pad members.

In an actual manufacturing process of the brake shoes 20, 30, it is difficult to measure the width L of each pair of the friction pad members 22, 23, 32, 33 (22a, 23a, 32a, 33a or 22b, 23b, 32b, 33b) at their upper opposite ends relative to the circumferential length of the disc rotor 10. To overcome such difficulty, it is preferable that the distance L between the upper opposite ends of each pair of the friction pad members is determined in a range of a central angle $\theta=\pi/6$ of the disc rotor 10 or less than about $2 \times r \times \sin(\pi/12)$ where the character r represents a radius of the disc rotor 10 opposed to the upper portion of each pair of the friction pad members. This means that the distance L between the upper opposite ends of each pair of the friction pad members is determined to be less than 1/12 of the circumferential length of the disc rotor 10. Thus, the width L between the upper opposite ends of each pair of the friction pad members can be determined by measurement of a straight line distance between opposite ends of a semi-circular portion defined by an angle of $\pi/12$ of the disc rotor 10.

Alternatively, the distance L may be defined to be less than a length of $r \times \sin(\pi/6)$. In this case, the distance L between the upper opposite ends of each pair of the friction pad members can be defined by measurement of a straight line distance between opposite ends of a semi-circular portion defined by an angle of $\pi/6$ of the disc rotor 10.

What is claimed is:

1. A disc brake assembly having a pair of brake shoes each with a friction pad member to be pressed into contact with a disc rotor having a circumferential length secured for rotation with a road wheel of an automotive vehicle, wherein upon contact with the brake shoes, the disc rotor oscillates at a three-nodes diametric mode.

wherein each friction pad member of said brake shoes has an upper portion with a total width determined to be less than substantially 1/12 of the circumferential length of said disc rotor at a position where said rotor is brought into frictional engagement with the upper portion of said friction pad member so that the friction pad member reduces oscillation frequencies of said disc rotor so that occurrence and level of brake noises noticeably decrease, wherein each friction pad member comprises a pair of laterally spaced friction pads respectively formed in an approximately trapezoidal shape, wherein the outer sides of each friction pad are formed as an oblique side having an upper outermost end, and wherein a distance between said upper outermost opposite ends of each pair of said friction pads is determined to be less than substantially $1/12$ of the circumferential length of said disc rotor.

2. A disc brake assembly having a pair of brake shoes each with a friction pad member to be pressed into contact with a disc rotor having a circumferential length secured for rotation with a road wheel of an automotive vehicle, wherein upon contact with the brake shoes, the disc rotor oscillates at a three-nodes diametric mode, wherein each friction pad member of said brake shoes has an upper portion with a total width determined to be less than substantially $1/12$ of the circumferential length of said disc rotor at a position where said rotor is brought into frictional engagement with the upper portion of said friction pad member so that the friction pad member reduces oscillation frequencies of said disc rotor so that occurrence and level of brake noises noticeably decrease, wherein each friction pad member comprises a pair of laterally spaced rectangular friction pads, and wherein a distance between upper outermost opposite ends of each pair of said friction pads is determined to be less than substantially $1/12$ of the circumferential length of said disc rotor.

3. A disc brake assembly having a pair of brake shoes to be pressed into contact with a disc rotor secured for rotation with a road wheel of an automotive vehicle, wherein each of said brake shoes has a friction pad member having an upper portion opposite a lower portion, the upper portion having an upper width less than a lower width of the lower portion, and the upper width in total is less than about $1/12$ of a circumferential length of said disc rotor at a position where said disc rotor is brought into frictional engagement with the upper portion of said friction pad member, wherein each of said friction pad members is formed in at least two laterally spaced portions and wherein the upper width and lower width are measured at outside edges of outermost laterally spaced portions.

* * * * *